US009673995B2

(12) United States Patent
Angst et al.

(10) Patent No.: US 9,673,995 B2
(45) Date of Patent: Jun. 6, 2017

(54) COMMUNICATION DEVICE AND METHOD FOR REDUNDANT MESSAGE TRANSMISSION IN AN INDUSTRIAL COMMUNICATION NETWORK

(71) Applicant: Siemens Aktiengesellschaft, Munich (DE)

(72) Inventors: Hermann Angst, Karlsruhe (DE); Franz-Josef Götz, Heideck (DE); Dieter Klotz, Fürth (DE); Joachim Lohmeyer, Hilpoltstein (DE); Matthias Scheffel, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 326 days.

(21) Appl. No.: 14/458,869

(22) Filed: Aug. 13, 2014

(65) Prior Publication Data

US 2015/0049639 A1 Feb. 19, 2015

(30) Foreign Application Priority Data

Aug. 14, 2013 (EP) .................................... 13180335

(51) Int. Cl.
*H04L 12/26* (2006.01)
*H04L 12/46* (2006.01)
(Continued)

(52) U.S. Cl.
CPC ............ *H04L 12/4641* (2013.01); *H04L 1/08* (2013.01); *H04L 1/22* (2013.01); *H04L 41/12* (2013.01); *H04L 45/24* (2013.01)

(58) Field of Classification Search
CPC ........ H04L 1/22; H04L 12/4641; H04L 45/24
See application file for complete search history.

(56) References Cited

U.S. PATENT DOCUMENTS

2004/0199662 A1* 10/2004 Karol ...................... H04L 63/18
709/238
2006/0256768 A1* 11/2006 Chan ........................ H04L 1/08
709/238

(Continued)

FOREIGN PATENT DOCUMENTS

CN          101682555          3/2010
CN          101989943          3/2011
(Continued)

OTHER PUBLICATIONS

Huynh M. et al; "Resilience technologies in Ethernet"; Elsevier Science Publishers B.V., Computer Networks; Bd. 54; Nr. 1; pp. 57-78;ISSN: 1389-1286; XP026835579;; 2010; Jan. 15, 2010.
(Continued)

*Primary Examiner* — Kevin C Harper
(74) *Attorney, Agent, or Firm* — Cozen O'Connor

(57) ABSTRACT

For redundant message transmission in an industrial communication network having an arbitrarily meshed network topology, mutually independent paths are ascertained for a communication link that is redundant at least in sections between two network nodes within the industrial communication network, where the mutually independent paths comprise separate network nodes of a single communication network, and messages with duplicate identifiers are interchanged between transmission and reception units of communication devices of the industrial communication network in accordance with forwarding rules that correspond to the ascertained paths.

15 Claims, 3 Drawing Sheets

(51) Int. Cl.
  *H04L 12/24* (2006.01)
  *H04L 1/08* (2006.01)
  *H04L 1/22* (2006.01)
  *H04L 12/707* (2013.01)

(56) References Cited

U.S. PATENT DOCUMENTS

| 2009/0060192 | A1* | 3/2009 | Budampati ......... H04L 63/0464 380/270 |
|---|---|---|---|
| 2010/0061229 | A1 | 3/2010 | Maisch et al. |
| 2011/0029687 | A1 | 2/2011 | Kirrmann et al. |
| 2012/0030310 | A1 | 2/2012 | Götz et al. |

FOREIGN PATENT DOCUMENTS

| CN | 102347856 | 2/2012 |
|---|---|---|
| EP | 2 165 474 | 3/2010 |
| EP | 2 282 452 | 2/2011 |
| EP | 2 413 538 | 2/2012 |

OTHER PUBLICATIONS

"IEC 62439 Part 3: Parallel Redundancy Protocol (PRP) and High-Availability Seamless Redundancy (HSR)"; pp. 1-62; Internet: URL:http://lamspeople.epfl.ch/kirrmann/pubs/IEC_61439-3/WG15-12-04d_62439-3_AMD-HK-101109.pdf; XP 002680227,; 2010; Dec. 31, 2010.

Nsaif Saad Allawi et al; "Improvement of High-Availability Seamless Redundancy (HSR) Traffic Performance for Smart Grid Communications"; Journal of Communications and Networks, Korean Institute of Communication Sciences, Seoul, KR; Bd. 14; Nr. 6; pp. 653-661; ISSN: 1229-2370; DOI: 10.1109/JCN.2012.00031; XP011487639; 2012; Dec. 1, 2012.

Office Action dated Feb. 3, 2017 which issued in the corresponding Chinese Patent Application No. 201410406017.7.

Allawi et al. "Improvement of High-Availability Seamless Redundancy (HSR) Traffic Performance", Department of Information and Communication Engineering, Myongji University, 2012, pp. 814-819.

Jungang et al. "Communication Network Redundancy Design of Intelligent Substation Based on IEC 62439-3", 2011, pp. 70-73.

\* cited by examiner

COMMUNICATION DEVICE AND METHOD FOR REDUNDANT MESSAGE TRANSMISSION IN AN INDUSTRIAL COMMUNICATION NETWORK

BACKGROUND OF THE INVENTION

1. Field of the Invention

The present invention relates to industrial automation systems and, more particularly, to a method for redundant message transmission in an industrial communication network.

2. Description of the Related Art

Usually, an industrial automation system comprises a multiplicity of industrial automation devices that are networked to one another via an industrial communication network and are used in the course of production or process automation to control or regulate installations, machines and devices. On account of time-critical constraints in technical systems that are automated via industrial automation devices, industrial communication networks predominantly use realtime communication protocols, such as Profinet, Profibus or realtime Ethernet, for communication between automation devices.

Interruptions in communication links between computer units of an industrial automation system or industrial automation devices are extremely problematical, because this can result not only in loss of information but also, for example, in undesirable or unnecessary repetition of a transmission of a service request. This causes additional utilization of communication links of the industrial automation system, which can result in further system faults or errors. Furthermore, messages that are not or not completely transmitted can prevent an industrial automation system from changing to or remaining in a safe operating state, for example. In the worst case, failure of a complete production installation and costly production stoppages can occur. Particular problems in industrial automation systems regularly result from message traffic with a relatively large number of, but relatively short, messages, which intensifies the above problems.

In order to be able to compensate for failures in communication links or devices, communication protocols, such as Media Redundancy Protocol, High-availability Seamless Redundancy, Parallel Redundancy Protocol or (Rapid) Spanning Tree Protocol, have been developed for high-availability, redundantly operable industrial communication networks.

Media Redundancy Protocol (MRP) is defined in International Electro Technical Commission (IEC) standard 62439 and allows compensation for single connection failures in networks with a simple ring topology in the event of bursty redundant transmission of messages. In principle, bursty media redundancy methods can be implemented with relatively little complexity. However, a disadvantage is that firstly messages can be lost in the case of error and, secondly, there is initially a fault state during reconfiguration of a communication network. Such a fault state needs to be backed up by a superimposed communication protocol, for example by means of TCP/IP at network or transport layer level, in order to prevent an interruption in a communication link.

High-availability Seamless Redundancy (HSR) and Parallel Redundancy Protocol (PRP) are defined in IEC standard 62439-3 and allow smooth redundant transmission of messages, particularly without changeover bursts in the event of topology changes. Based on High-availability Seamless Redundancy and Parallel Redundancy Protocol, each message is duplicated by a sending communication device and is sent to a receiver in two different ways. A receiver-end communication device filters out redundant messages that are duplicates from a received data stream.

In a redundant HSR or PRP communication network, a network component that provides access to the redundant communication network can assume different roles. Such a network component that conveys telegrams between subscribers or terminals in an HSR or PRP communication network, on the one hand, and terminals or network segments without HSR/PRP functionality, on the other hand, is called an HSR/PRP proxy or RedBox. In principle, a network component can connect a plurality of HSR rings or convert communication between HSR and PRP network segments for the purpose of accessing a redundant HSR or PRP communication network. In this case, the network component is called an HSR-HSR coupler or QuadBox or HSR-PRP coupler.

EP 2 165 474 A2 discloses a method for operating a network that has a switch and also network infrastructure devices connected thereto. The switch is controlled by a control unit. A redundancy unit connected between the switch and the control unit analyzes a data stream between the switch and the control unit and inserts data into the data stream or removes data from the data stream on the based on an analysis result.

EP 2 282 452 A1 describes a method for data transmission within a ring-like communication network, in which the data transmission occurs based on High-availability Seamless Redundancy and the communication network comprises at least a master node, a source node and a destination node. Each node has a first and a second communication interface with a respective first and second neighboring node. Furthermore, each node receives data frames via the first communication interface and forwards the received data frame in either altered or unaltered form via the second communication interface without additional delay. The master node sends a first and a second redundant data frame or an empty data frame to its first or second neighboring node. When the two redundant data frames are received, the source node fills the respective data frame in a predetermined reserved area with process data. Next, each filled data frame is immediately and individually forwarded to the first or second neighboring node of the source node. Finally, the destination node extracts the process data from the first received filled data frame in a pair of redundant data frames.

EP 2 413 538 A1 discloses a method for redundant communication in a communication system that comprises a plurality of communication networks. The communication networks are connected to one another via at least one coupling node. Transmission of data that come from a first communication network back to the first communication network from a second communication network is prevented based on a piece of information that is defined prior to data transmission.

Methods for smooth redundant transmission of messages in accordance with High-availability Seamless Redundancy or Parallel Redundancy Protocol are limited in their application to network topologies having ring structures or having a plurality of redundant communication networks that are constructed separately from one another.

SUMMARY OF THE INVENTION

It is therefore an object of the present invention to provide an essentially topology-independent method for redundant, smooth message transmission in a meshed industrial communication network and to provide a communication device that is suitable for implementing the method.

These and other objects and advantage are achieved in accordance with the invention by a communication device and method for redundant message transmission in an industrial communication network, in which at least one communication device comprises at least a first and a second transmission and reception unit that each have an interface for a network connection of the industrial communication network and are connected to a coupling element of the communication device. By way of example, this communication device may be a switch or a bridge. The coupling element is preferably a high-speed bus. Alternatively, the coupling element may also be implemented via a matrix switching network, in principle. The transmission and reception units have an associated signal processing unit of the communication device that sends messages that are to be sent in redundant form by the communication device in duplicated form from the transmission and reception units and detects messages received in redundant form from the transmission and reception units on the communication device. Depending on the protocol level, a message can be represented by a data segment, a data packet or a data frame, for example. In accordance with the invention, messages that are redundant with respect to one another are denoted by a common duplicate identifier.

Furthermore, the industrial communication network has an arbitrarily meshed network topology in accordance with the disclosed method of the invention. By way of example, a communication network having a meshed network topology comprises a respective plurality of paths between two network nodes, where the paths are routed via separate coupling units, such as switches or bridges, and coupling sections, such as wired or unwired communication links. Mutually independent paths are ascertained for a communication link that is redundant at least in sections between two network nodes within the industrial communication network, and where the mutually independent paths comprise separate network nodes. Messages with duplicate identifiers are interchanged between the transmission and reception units of the communication device in accordance with forwarding rules that correspond to the ascertained paths. In this way, smooth media redundancy can be implemented in a single communication network having an arbitrarily meshed network topology.

In principle, it is possible for only subregions of a communication network to have a meshed network topology. Hence, only partially redundant paths are available. Accordingly, a communication network having a network topology that is meshed only in subregions is protected against failures only in these subregions.

In accordance with an embodiment of the method in accordance with the invention, the coupling element connects a singly connected network node to the transmission and reception units. The duplicate identifiers are inserted by the singly connected network node into messages that are to be sent in redundant form. Correspondingly, duplicate identifiers are removed by the singly connected network node from redundantly received messages. In an alternative embodiment, the duplicate identifiers are inserted by the signal processing unit into messages that are to be sent in redundant form from the singly connected network node and removed from redundantly received messages for the singly connected network node.

Messages interchanged in a communication relationship on an ascertained path can be explicitly identified from source and destination addresses, a stipulated priority or an identity for a virtual local area network or from a combination of these details. Source and destination addresses may be both IP addresses and MAC addresses. By way of example, virtual local area networks can include logical groupings of communication subscribers or connections, i.e., VLANs. In accordance with an advantageous embodiment of the method in accordance with the invention, a respective virtual local area network is set up for the ascertained mutually independent paths. In this case, the ascertained mutually independent paths are identified from an identity for their associated virtual local area network. A virtual local area network can be set up on a port basis or dynamically.

The signal processing unit of the communication device is preferably implemented via a field programmable gate array (FPGA), while the coupling element is a backplane switch with an associated controller, for example. Hence, an FPGA can take on network coupling tasks effectively as a coprocessor for a backplane switch controller. Backplane switch controllers usually have a VLAN functionality. As a result, it is possible to simplify connection of an FPGA as a coprocessor for a backplane switch. This is because the FPGA can use respective VLAN identities in data frames to handle messages in a manner differentiated according to the ascertained mutually independent paths. In addition, an FPGA can be used to store a table (proxy node table) with details relating to all of the singly connected network nodes connected to the coupling element. This allows simple management of singly connected network nodes connected to the communication device.

By way of example, the mutually independent paths can be ascertained by a central entity within the industrial communication network or locally by the network nodes of the industrial communication network. In particular, the mutually independent paths can be ascertained by the signal processing unit of the communication device.

Preferably, a memory unit associated with the signal processing unit is used to store duplicate identifiers from messages already received without error. Accordingly, the signal processing unit, when receiving a new message, checks the duplicate identifier thereof for a match with an already stored duplicate identifier.

The communication device for a redundantly operable industrial communication network in accordance with the invention is suitable for implementing the method described above and comprises at least a first and a second transmission and reception unit that each have an interface for a network connection of the industrial communication network. In addition, a coupling element connected to the transmission and reception units is provided. The transmission and reception units have an associated signal processing unit that comprises a replication unit for duplicating messages that are to be sent redundantly by the transmission and reception units and a filter unit that is configured to detect redundantly received messages. Here, mutually redundant messages are denoted by a common duplicate identifier.

Furthermore, the inventive communication device in accordance with the invention is configured to operate in an industrial communication network having a meshed network topology. Here, mutually independent paths are ascertained for a communication link that is redundant at least in sections between two network nodes within the industrial communication network, where the mutually independent paths comprise separate network nodes. Furthermore, the signal processing unit comprises a forwarding unit that is configured to ensure that messages with duplicate identifiers are interchanged between the transmission and reception units of the communication device in accordance with forwarding rules that correspond to the ascertained paths.

By way of example, the coupling element may connect a singly connected network node to the transmission and reception units. The signal processing unit may comprise a functional unit that is configured to ensure that duplicate identifiers are inserted by the signal processing unit into messages that are to be sent in redundant form from the singly connected network node. Furthermore, the signal processing unit may comprise a functional unit that is configured to ensure that duplicate identifiers are removed by the signal processing unit from redundantly received messages for the singly connected network node. In this way, singly connected network nodes without redundancy functions can be incorporated into smooth media redundancy methods for communication networks having an arbitrary meshed network topology.

Preferably, a respective virtual local area network is set up for the ascertained mutually independent paths. In this case, the ascertained mutually independent paths can be identified from an identity for their associated virtual local area network. In accordance with an advantageous embodiment of the communication device, the coupling element comprises a control unit that is configured to operate virtual local area networks. In accordance with a further embodiment, the signal processing unit is configured to ascertain the mutually independent paths, for example, as a central entity within the industrial communication network.

The transmission and reception units may be connected to the coupling element directly or via the signal processing unit. The signal processing unit may in turn be connected to the transmission and reception units directly or via the coupling element.

In accordance with a particularly preferred embodiment of the communication device, the signal processing unit comprises a memory unit for storing duplicate identifiers from messages already received without error. Furthermore, the filter unit is configured so that, when receiving a new message, it checks the duplicate identifier thereof for a match with an already stored duplicate identifier.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE PREFERRED EMBODIMENTS

Figure 1:
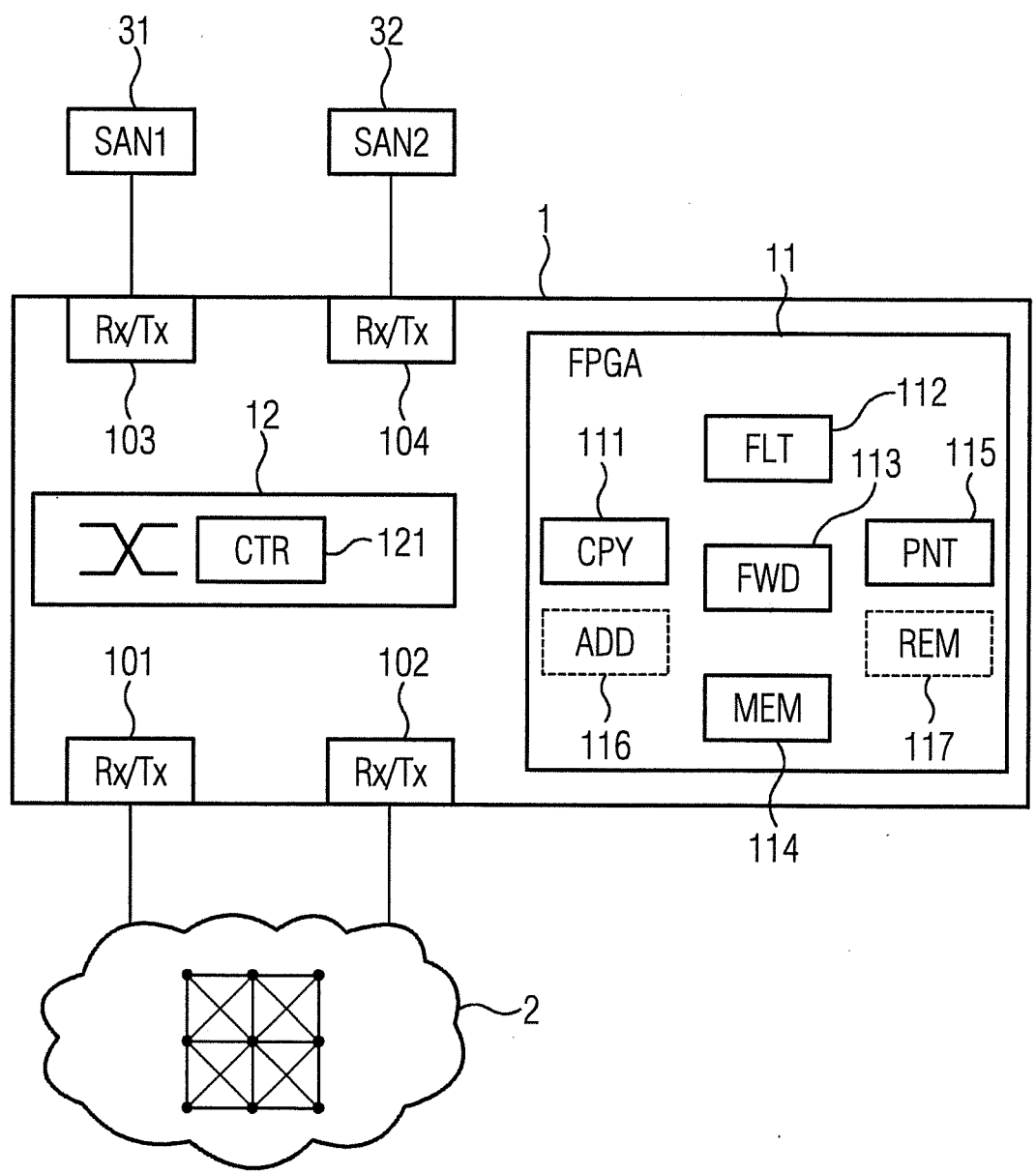
FIG. 1 shows a schematic illustration of a communication device for a redundantly operable industrial communication network.

The communication device 1 shown in FIG. 1 for a redundantly operable industrial communication network 2 comprises a plurality of transmission and reception units 101, 102, 103, 104 that each have an interface for a network connection of the industrial communication network 2. Here, a first and a second transmission and reception unit 101, 102 are connected to the industrial communication network 2 directly. The transmission and reception units 101, 102, 103, 104 have a coupling element 12 connected to them. In the present exemplary embodiment, the coupling element 12 connects two singly connected network nodes 31, 32 to the first 101 and the second 102 transmission and reception unit. Furthermore, the coupling element 12 comprises a control unit 121 that is configured to operate virtual local area networks. Preferably, the coupling element 12 is provided by a backplane switch having an integrated controller.

The transmission and reception units 101, 102, 103, 104 have an associated signal processing unit 11 that is provided via a field programmable gate array (FPGA) and that comprises a replication unit 111 for duplicating messages that are to be sent in redundant form by the first 101 and the second 102 transmission and reception unit. Furthermore, the signal processing unit 11 has a filter unit 112 that is configured to detect messages received in redundant form by the first 101 and the second 102 transmission and reception unit. Messages that are redundant with respect to one another are denoted by a common duplicate identifier in this case.

The communication device is configured to operate in an industrial communication network 2 having a meshed network topology. Mutually independent paths are ascertained for a communication link that is redundant at least in sections between two network nodes within the industrial communication network, where the mutually independent paths comprise separate network nodes of a single communication network. Furthermore, the signal processing unit comprises a forwarding unit 113 that is configured to ensure that messages with duplicate identifiers are interchanged between the transmission and reception units 101, 102 of the communication device 1, which are connected directly to the meshed communication network 2, in accordance with forwarding rules that correspond to the ascertained paths. In principle, the forwarding unit 113 can, in accordance with a possible embodiment, also ascertain redundant mutually independent paths or provide forwarding rules for communication devices at further network nodes within the industrial communication network 2.

Furthermore, the signal processing unit 11 comprises a memory unit 114 for storing duplicate identifiers from messages already received without error. Here, the filter unit 112 is configured so that, when receiving a new message, the filter unit 112 checks the duplicate identifier thereof for a match with an already stored duplicate identifier. In addition, the signal processing unit 11 comprises a memory unit 115 for storing a table (proxy node table) with details relating to all of the singly connected network nodes 31, 32 connected to the coupling element 12.

Specifically for singly connected network nodes 31, 32 without any redundancy functions, the signal processing unit 11 comprises, as an optional component, a functional unit 116 that is configured to ensure that duplicate identifiers are inserted by the signal processing unit 11 into messages that are to be sent in redundant form from a singly connected network node 31, 32. In addition, the signal processing unit 11 has, as an optional component, a functional unit 117 that is configured to ensure that duplicate identifiers are removed by the signal processing unit 11 from redundantly received messages for a singly connected network node 31, 32.

The communication device shown in FIG. 1 is suitable for implementing a method for redundant message transmission in an industrial communication network 2, in which the industrial communication network has a meshed network topology 2, and in which mutually independent paths are ascertained for a communication link that is redundant at least in sections between two network nodes within the industrial communication network, where the mutually independent paths comprise separate network nodes of a single communication network. The mutually independent paths can be ascertained both by a central entity within the industrial communication network and locally by the network nodes of the industrial communication network. By way of example, a respective virtual local area network can be set up for the ascertained mutually independent paths. Accordingly, the ascertained mutually independent paths are identified from an identity for their associated virtual local area network.

Figure 2:
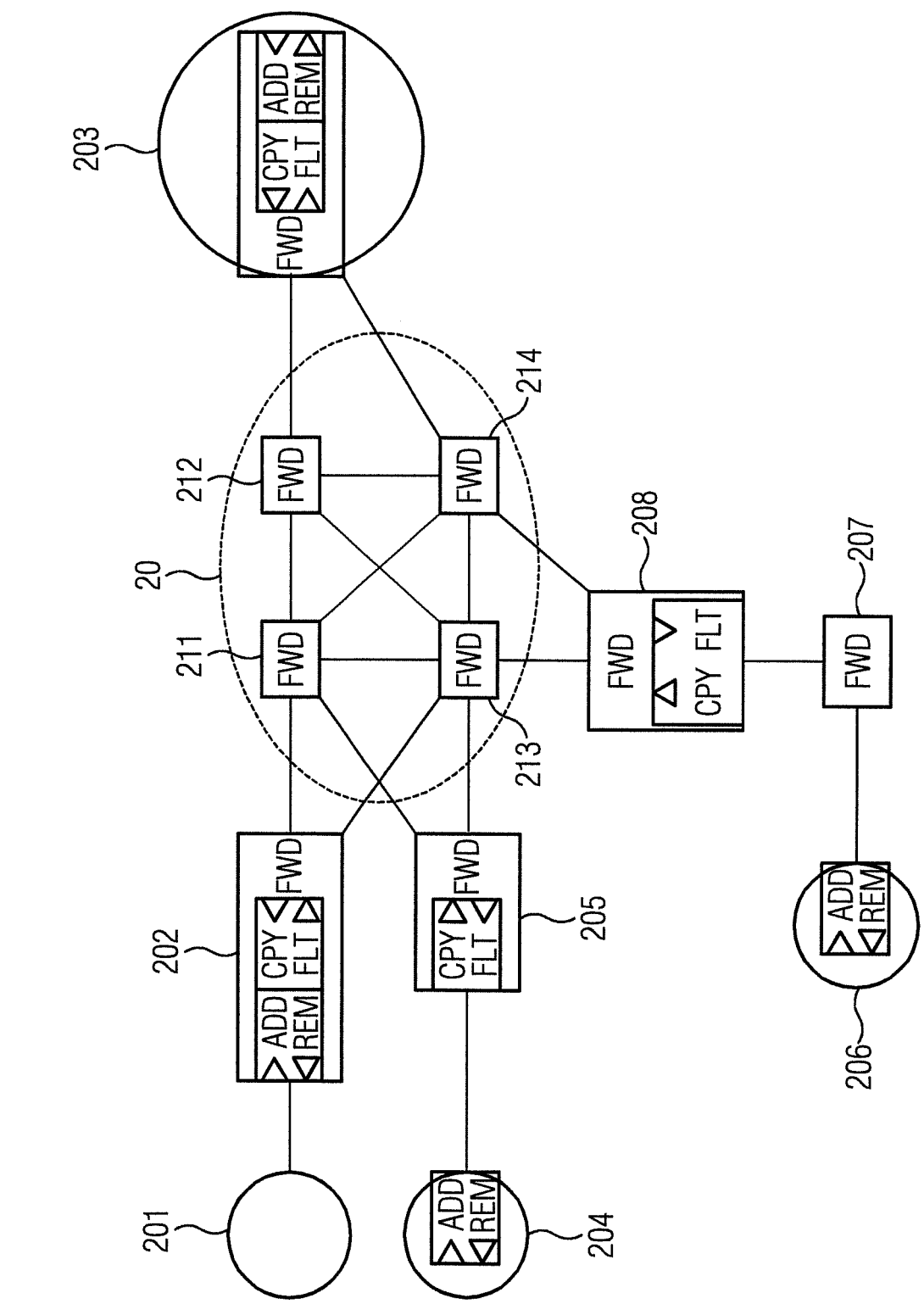
FIG. 2 shows a schematic illustration of a meshed redundantly operable industrial communication network.

FIG. 2 shows an exemplary simple meshed communication network having a plurality of network nodes 201-208, 211-214 that has redundant paths in a region 20 of network nodes 211-214 that are meshed to one another to a high degree. The network nodes 201-208, 211-214 perform the following basic functions for smooth media redundancy in arbitrarily meshed communication networks to different degrees:

ADD (add)—Insert an explicit duplicate identifier into messages that are to be transmitted redundantly,
CPY (copy)—Replicate or copy messages with a duplicate identifier at branch points within the communication network,
FWD (forward)—Forward messages with a duplicate identifier,
FLT (filter)—Eliminate or reject unnecessary copies of messages following detection of redundantly received messages,
REM (remove)—Remove a duplicate identifier from redundantly transmitted messages.

The network nodes 211-214 perform just the basic function FWD and interchange messages with duplicate identifiers between their connections in accordance with forwarding rules that correspond to the ascertained paths. By way of example, the basic function FWD can be performed by switches without redundancy functions.

The network nodes 201, 204 and 206 are singly connected terminal nodes. In this case, the network node 201 does not perform any kind of redundancy functions in the present exemplary embodiment, whereas the network nodes 204 and 206 perform the basic functions ADD and REM anyway. Accordingly, the network node 202, which serves as a branch point for the network node 201, performs all of the aforementioned basic functions. The network nodes 205 and 208, which serve as branch points for the network nodes 204 and 206, merely need to perform the basic functions CPY, FLT and FWD, because the two singly connected network nodes 204 and 206 already perform fundamental basic functions. In contrast to the network node 206, which is connected to its associated branch point indirectly via a network node 207 with a forwarding function (FWD), the network node 204 is connected to its associated branch point directly.

The network node 203 is a terminal node that is doubly connected to the communication network shown in FIG. 2. Based on this, it performs all of the aforementioned basic functions in order to carry out the method for redundant message transmission that is described above.

Figure 3:
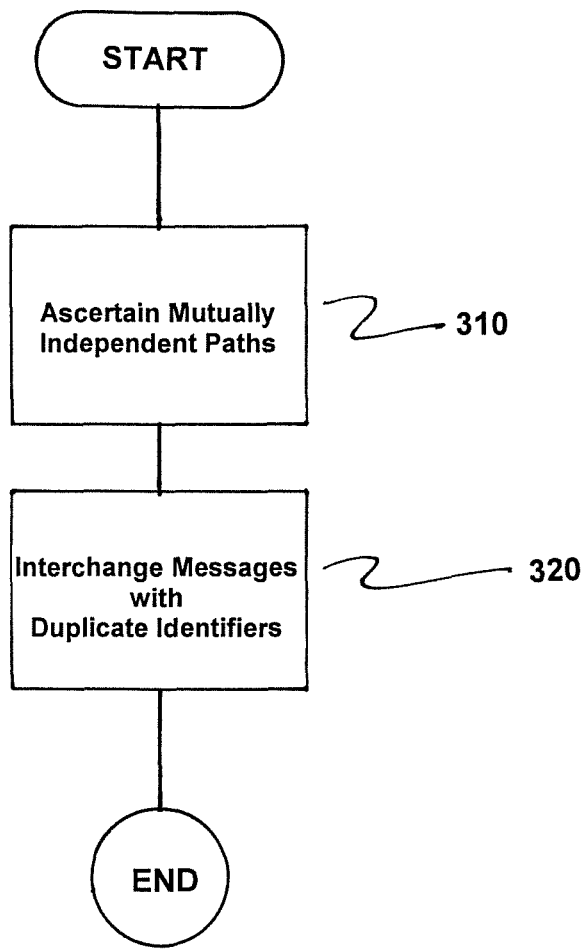
FIG. 3 is a flowchart of the method in accordance with the invention.

FIG. 3 is a flowchart of a method for redundant message transmission in an industrial communication network. The method comprises ascertaining mutually independent paths for a communication link that is redundant at least in sections between two network nodes within the industrial communication network, as indicated in step 310. Here, the mutually independent paths comprises separate network modes of a single communication network. Next, messages with duplicate identifiers are interchanged between first and second transmission and reception units of the communication device in accordance with forwarding rules that correspond to the ascertained paths, as indicated in step 320.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A method for redundant message transmission in an industrial communication network, in which at least one communication device comprises at least a first and a second transmitter/receiver that each have an interface for a network connection of the industrial communication network and are connected to a coupling element of the communication device, the first and second transmitter/receivers have an associated signal processor of the at least one communication device that sends messages that are to be sent in redundant form by the communication device in duplicated form from the first and second transmitter/receivers and detects messages received in redundant form from the first and second transmitter/receivers of the communication device, and in which messages that are redundant with respect to one another are denoted by a common duplicate identifier, the method comprising:

ascertaining mutually independent paths for a communication link that is redundant at least in sections between two network nodes within the industrial communication network, the mutually independent paths comprising separate network modes of a single communication network; and
interchanging messages with duplicate identifiers between the first and second transmitter/receivers of the communication device in accordance with forwarding rules that correspond to the ascertained paths;
wherein the industrial communication network has a meshed network topology;
wherein a respective virtual local area network is set up for the ascertained mutually independent paths; and wherein the ascertained mutually independent paths are identified from an identity for their associated virtual local area network.

2. The method as claimed in claim 1, wherein the coupling element connects a singly connected network node to the first and second transmitter/receivers, wherein duplicate identifiers are inserted by the singly connected network node into messages that are to be sent in redundant form, and wherein duplicate identifiers are removed by the singly connected network node from messages that are received in redundant form.

3. The method as claimed in claim 1, wherein the coupling element connects a singly connected network node to the first and second transmitter/receivers, and wherein duplicate identifiers are inserted by the signal processor into messages that are to be sent in redundant form from the singly connected network node, and wherein duplicate identifiers are removed by the signal processor from redundantly received messages for the singly connected network node.

4. The method as claimed in claim 1, wherein the mutually independent paths are ascertained by the signal processor.

5. The method as claimed in claim 1, wherein the mutually independent paths are ascertained by a central entity within the industrial communication network.

6. The method as claimed in claim 1, wherein the mutually independent paths are ascertained locally by the network nodes of the industrial communication network.

7. The method as claimed in claim 1, further comprising:
storing, by memory associated with the signal processor, duplicate identifiers from messages already received without error, and
checking, by the signal processor, upon receiving a new message, the duplicate identifier thereof for a match with an already stored duplicate identifier.

8. A communication device for a redundantly operable industrial communication network, comprising:
at least first and second transmitter/receivers that each have an interface for a network connection of the industrial communication network;
a coupling element connected to the transmitter/receivers; and
a signal processor associated with the first and second transmitter/receivers, the signal processor comprising a replicator for duplicating messages that are to be sent in redundant form by the first and second transmitter/receivers and comprising a filter configured to detect redundantly received messages, messages redundant with respect to one another being denoted by a common duplicate identifier;
wherein the communication device is configured to operate in an industrial communication network having a meshed network topology;
wherein mutually independent paths are ascertained for a communication link that is redundant at least in sections between two network nodes within the industrial communication network, said mutually independent paths comprising separate network nodes of a single communication network; and
wherein the signal processor further comprises a forwarding unit configured to ensure messages with duplicate identifiers are interchanged between the first and second transmitter/receivers of the communication device in accordance with forwarding rules that correspond to the ascertained paths.

9. The communication device as claimed in claim 8, wherein the coupling element connects a singly connected network node to the transmitter/receivers;
wherein the signal processor further comprises a functional unit configured to ensure duplicate identifiers are inserted by the signal processor into messages that are to be sent in redundant form from the singly connected network node; and
wherein the signal processor further comprises a functional unit configured to ensure duplicate identifiers are removed by the signal processor from redundantly received messages for the singly connected network node.

10. The communication device as claimed in claim 8, wherein a respective virtual local area network is set up for the ascertained mutually independent paths, wherein the ascertained mutually independent paths are identifiable from an identity for their associated virtual local area network, and wherein the coupling element comprises a controller configured to operate virtual local area networks.

11. The communication device as claimed in claim 9, wherein a respective virtual local area network is set up for the ascertained mutually independent paths, wherein the ascertained mutually independent paths are identifiable from an identity for their associated virtual local area network, and wherein the coupling element comprises a controller configured to operate virtual local area networks.

12. The communication device as claimed in claim 8, wherein the signal processor is configured to ascertain the mutually independent paths.

13. The communication device as claimed in claim 8, wherein the first and second transmitter/receivers are one of (i) directly connected to the coupling element and (ii) connected to the coupling element via the signal processor.

14. The communication device as claimed in claim 8, wherein the signal processor is one of (i) directly connected to the first and second transmitter/receivers and (ii) connected to the first and second transmitter/receivers via the coupling element.

15. The communication device as claimed in claim 8, wherein the signal processor comprises memory for storing duplicate identifiers from messages already received without error, and wherein the filter is configured to check a duplicate identifier thereof for a match with an already stored duplicate identifier when receiving a new message.

* * * * *